United States Patent [19]

Tamaru et al.

[11] Patent Number: 5,726,649
[45] Date of Patent: Mar. 10, 1998

[54] CONTROL DEVICE SUITABLE FOR USE IN AN APPARATUS FOR REPRODUCING VIDEO, AUDIO AND ACCOMPANYING CHARACTERS

[75] Inventors: Takuya Tamaru; Shigetomo Nakamura, both of Hamamatsu, Japan

[73] Assignee: Yamaha Corporation, Hamamatsu, Japan

[21] Appl. No.: 520,378

[22] Filed: Aug. 29, 1995

[30] Foreign Application Priority Data

Sep. 5, 1994 [JP] Japan ................................. 6-211613

[51] Int. Cl.⁶ ....................................... G11B 33/00
[52] U.S. Cl. ..................... 341/35; 200/526; 200/527
[58] Field of Search ........................ 341/35, 20, 22, 341/34, 176, 173; 235/145 R; 345/103; 200/28, 273, 526, 527

[56] References Cited

U.S. PATENT DOCUMENTS

| 4,846,597 | 7/1989 | Bryant | 400/472 |
| 5,351,161 | 9/1994 | MacKay | 360/137 |
| 5,408,275 | 4/1995 | Song | 348/734 |
| 5,448,240 | 9/1995 | Morito | 341/176 |

FOREIGN PATENT DOCUMENTS 2190029  1/1989  Japan .

*Primary Examiner*—Jeffery Hofsass
*Assistant Examiner*—Albert K. Wong
*Attorney, Agent, or Firm*—Loeb & Loeb LLP

[57] ABSTRACT

A control device suitable for use in a sing-along or karaoke apparatus has a rotary encoder coupled to a selector knob through a transfer mechanism, such as gears. When the selector knob rotates, the rotary encoder generates pulse signals for each rotation of the selector knob. The number of pulses may depend upon a gear ratio of the transfer mechanism. The control device is used, for example, to scan and select music titles stored in a ROM cartridge or other suitable storage medium. The control device may be integrated with an apparatus for controlling the start or stop function. The control device provides a design flexibility due to its compact design.

12 Claims, 8 Drawing Sheets

MUSIC SELECTION INPUT UNIT

FIG. 6

| | | | | |
|---|---|---|---|---|
| 0 | K · 1D | K · 1D | K · 1D | K · 1D |
| 4 | K · Title 1a | K · Title 1b | K · Title 2a | K · Title 2b |
| 8 | K · Title 3a | K · Title 3b | K · Title 4a | K · Title 4b |
| 12 | ~ | ~ | ~ | ~ |
| 24 | K · Title 11a | K · Title 11b | K · Title 12a | K · Title 12b |
| 28 | 00000000 | 00000000 | 00000000 | 00000000 |
| 32 | K · Kana - Title 1a | K · Kana - Title 1b | K · Kana - Title 2a | K · Kana - Title 2b |
| 36 | ~ | ~ | ~ | ~ |
| 56 | ~ | ~ | ~ | ~ |
| 60 | K · Kana - Title 15a | K · Kana - Title 15b | K · Kana - Title 16a | K · Kana - Title 16b |
| 64 | 00000000 | 00000000 | 00000000 | 00000000 |
| 68 | 00000000 | P - KFN | | |
| 72 | 00000000 | P - KFNK | | |
| 76 | 00000000 | P - BMF | | |
| 80 | 00000000 | P - FSA | | |
| | 00000000 | 00000000 | 00000000 | 00000000 |

| | | | | |
|---|---|---|---|---|
| [P · KFN] | Karaoke File Name | | | |
| | ~ | | | |
| | ~ | | | |
| | Karaoke File Name | | | |
| | 00000000 | 00000000 | 00000000 | 00000000 |
| [P · KFNK] | Karaoke File Name For LCD Display | | | |
| | ~ | | | |
| | Kraoke File Name | | | |
| | 00000000 | 00000000 | 00000000 | 00000000 |
| [P · BWF] | Fontdata File DATA | | | |
| | ~ | | | |
| | ~ | | | |
| | 00000000 | 00000000 | 00000000 | 00000000 |
| [P · FAS] | 00000000 | Start address (FNO / 1) | | |
| | 00000000 | End address (FNO / 1) | | |
| | 00000000 | Start address (FNO / 2) | | |
| | 00000000 | End address (FNO / 2) | | |
| | ~ | | | |
| | 00000000 | 00000000 | 00000000 | 00000000 |

NUMBER AND TITLE OF MUSIC PIECE
TO BE PERFORMED ARE DISPLAYED

DISPLAY

▶ : NOT SELECTED
▷ : SELECTED

5,726,649

CONTROL DEVICE SUITABLE FOR USE IN AN APPARATUS FOR REPRODUCING VIDEO, AUDIO AND ACCOMPANYING CHARACTERS

BACKGROUND OF THE INVENTION

1. Field of the Invention

The invention relates to a control device used for selecting and activating/deactivating pre-recorded music programs, wherein the control device is suitable for use in an apparatus for reproducing video, audio and accompanying characters, such as a sing-along or karaoke apparatus.

2. Related Art

Typically, a portable sing-along or karaoke apparatus has a display unit for showing the title of a music piece, and a control knob for selecting music pieces. By rotating the control knob, the music titles are displayed on the display unit. In the karaoke apparatus, the control knob is connected to a rotary encoder through a rotation shaft. When the rotary encoder generates a pulse signal in response to the rotation of the control knob, the displayed title of the music piece changes one at a time. The rotary encoder used in the karaoke apparatus determines the number of pulses generated for each rotation of the control knob. After selecting a music piece by rotating the control knob, a separately located start/stop device must be activated to start the music piece. In the prior art, such a start/stop device was disposed separately from the control knob since the rotation shaft of the knob is directly connected to an input shaft of the rotary encoder.

SUMMARY OF THE DISCLOSURE

Accordingly, it is an object of the invention to provide a control device in which the number of pulses generated for one rotation of a selector knob may be arbitrarily set by a rotary encoder. The control device also integrates an activation device, such as a start/stop switch, to minimize its size.

In accordance with an embodiment of the invention, a control device is suitable for use in an apparatus that reproduces pre-recorded performance information, such as a sing-along or karaoke machine. The control device has a knob, a rotation encoder and a transfer mechanism. The knob is rotatable about its axis and is used for selecting music programs. The rotation encoder is responsive to a rotation motion of the knob and produces a pulse signal corresponding to the rotation motion of the knob. The transfer mechanism is coupled between the knob and the rotation encoder to transfer the rotation motion of the knob to the rotation encoder. The transfer mechanism has a transfer ratio greater one to produce more than one pulse signal for each revolution of the knob.

In further embodiments, there may be a switch mounted substantially underneath the knob. Moreover, the control device may include a center member that has a pair of legs protruding downward to activate the switch when the center member is depressed. A spring may be disposed underneath the center member to maintain an un-depressed state when no pressure is exerted thereon.

In still further embodiments, the transfer mechanism may include a plurality of gears in which a first gear is coupled to the knob and a second gear is coupled to the rotation encoder. The first gear and the second gear engages each other so that the ration motion from the knob is transferred to the rotation encoder. The rotation encoder may be configured to produce one pulse signal for each tooth of the second gear rotated. This allows many music titles to be searched with minimum rotation of the knob. In place of the gears, the transfer mechanism may include a plurality of pulleys and a belt wound around the pulleys in which a first pulley is coupled to the knob and a second pulley is coupled to the rotation encoder.

In accordance with a second embodiment of the invention, a control device may operate in conjunction with a system control unit which controls a program selection, and a start and stop function of a selected program. In this embodiment, the pulse signal produced from the rotation encoder allows the system control unit to scan the titles of the programs. In addition, the switch generates a signal to trigger the system control unit to select a music program, start or stop the music performance.

Other features and advantages of the invention will become apparent from the following detailed description, taken in conjunction with the accompanying drawings which illustrate, by way of example, various features of embodiments of the invention.

BRIEF DESCRIPTION OF THE DRAWINGS

A detailed description of embodiments of the invention will be made with reference to the accompanying drawings, wherein like numerals designate corresponding parts in the several figures.

FIG. 6 is a memory map of a ROM cartridge 50 used in a sing-along or karaoke apparatus;

DETAILED DESCRIPTION OF THE PREFERRED EMBODIMENTS

This application fully incorporates by reference the following applications: (1) the application entitled "APPARATUS FOR REPRODUCING VIDEO, AUDIO AND ACCOMPANYING CHARACTERS AND METHOD OF MANUFACTURE" by Narusawa et al., filed Sep. 1, 1995 and bearing U.S. patent application Ser. No. 08/522,714; and (2) the application entitled "APPARATUS FOR REPRODUCING VIDEO, AUDIO AND ACCOMPANYING CHARACTERS AND METHOD OF MANUFACTURE" by Narusawa et al., filed Sep. 5, 1995 and bearing U.S. patent application Ser. No. 08/523,720.

Figure 2:
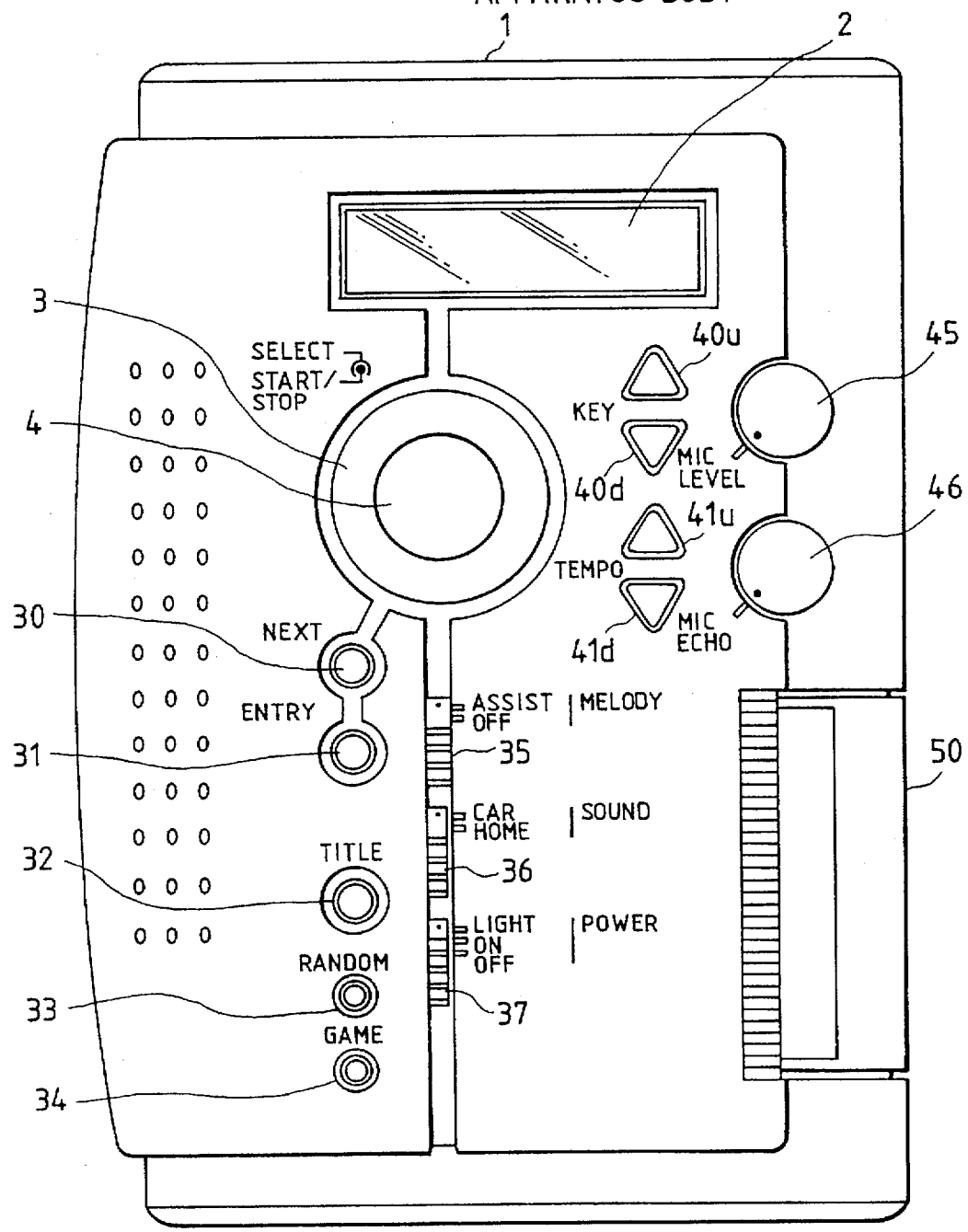
FIG. 2 is a front external view of the apparatus shown in FIG. 1.

As shown in the drawings for purposes of illustration, the invention is embodied in a sing-along or karaoke apparatus. FIG. 2 is a front external view of the karaoke apparatus that uses a control device according to an embodiment of the invention. A liquid crystal display unit 2 is disposed in the upper portion of the front panel of the body 1. A music selection input unit (the control device) 15 is located below the display unit 2 and has a selector knob 3 for selecting a music piece and a start/stop button (the center portion) 4 for playing or stopping the music. The arrangement of the above components may be changed pursuant to the design requirement of the invention.

Figure 3:
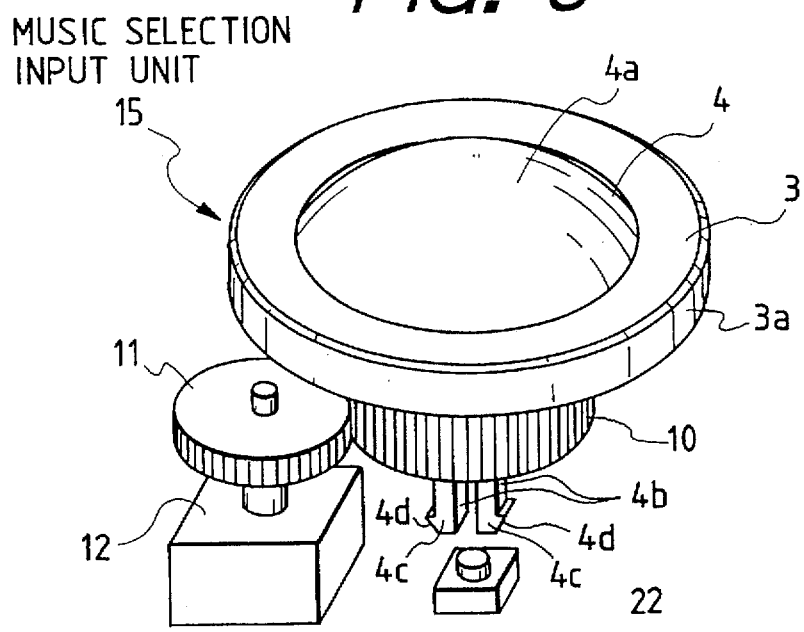
FIG. 3 is a perspective view of a control device according to an embodiment of the invention.
Figure 4:
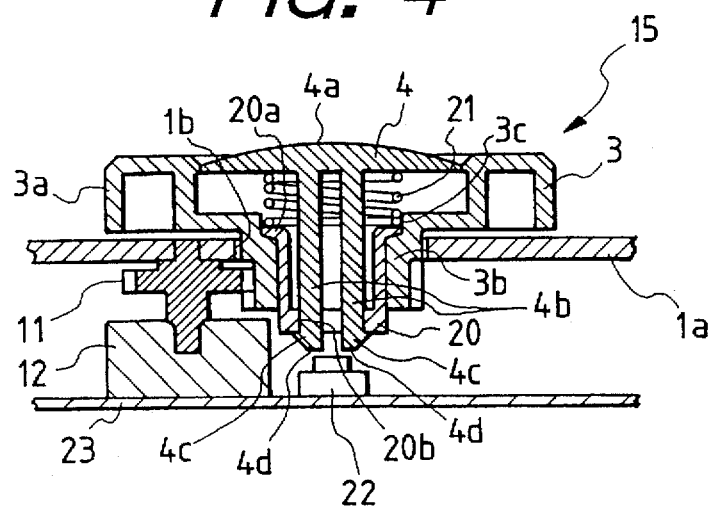
FIG. 4 is a sectional view of the control device shown in FIG. 3.

FIG. 3 is a perspective view of the music selection input unit 15 according to an embodiment of the invention. FIG. 4 is a sectional view of the music selection input unit 15 attached to the front panel 1a of the karaoke apparatus. The selector knob 3 has an outer member 3a which has a substantially ring-like external shape, and a support member 3b which is axially aligned with and coupled to the outer member 3a. To minimize the slippage of the selector knob 3 during rotation, the outer peripheral surface of the outer member 3a forms a serration (not shown). The support member 3b has a cylindrical shape with a hollow center in which a guide member 20 is inserted therethrough so that the inner surface of the support member 3b slides against the outer surface of a guide member 20. The support member 3b has a first gear 10 formed on the outer surface. The selector knob 3 and the guide member 20 are mounted on the front panel through a hold 1b. This mounting configuration allows the selector knob 3 to rotate about its axis.

In a preferred embodiment of the invention, a board 23 suitable for mounting various components, such as a rotary encoder (or a rotation encoder) 12, is disposed underneath the front panel 1a. A second gear 11 having a shaft 11a is connected to the rotary encoder 12. The lower end of the shaft 11 is coupled to the rotary encoder 12, and the upper end of the shaft 11a is coupled to the front panel 1a so that the shaft 11a may rotate about its axis. The first gear 10 and the second gear 11 are in close proximity to engage each other. When the selector knob 3 rotates, the rotation force is transferred to the rotary encoder 12 through the first 10 and the second 11 gears. As a result, the rotary encoder 12 outputs pulses corresponding to the amount of rotation.

In the preferred embodiment, the gear ratio (or the transfer ratio) of the first gear 10 and the second gear 11 may be set in accordance with the specification of the karaoke apparatus. It is preferable that the gear ratio (the number of teeth of the first gear 10 to that of the second gear 11) is set to a number greater than 1, such as 2. Where the gear ratio is set to 2, the second gear 11 rotates twice for each revolution of the selector knob 3. Consequently, the rotary encoder 12 outputs two pulses for each rotation of the selector knob 3. If the number of music selection is large, the gear ratio may be set to a larger value to avoid excessive rotation of the selector knob 3. The larger gear ratio permits the rotary encoder 12 to produce more pulses for each rotation of the selector knob 3.

In the preferred embodiment, each tooth of the second gear 11 may correspond to a pulse generated by the rotary encoder 12. A latch mechanism (not shown), which is constructed with a plate spring, or the like, engages with the second gear 11 and applies a small resistance each time the second gear 11 advances by a distance corresponding to one tooth. As the selector knob 3 rotates, this resistance may produce a "click" feeling or sound. One click corresponds to one pulse and provides a convenient feedback to control the number of pulses generated by the rotary encoder 12.

The guide member 20, which is disposed inside the support member 3b of the selector knob 3, has a substantially cylindrical shape. The guide member 20 is dispositioned in and integrated with the front panel 1a to form one body. The guide member 20 may be fixedly attached to the front panel 1a. The guide member 20 has a flange 20a at one end, and has a hole 20b with a rectangularly shaped cross-section at the other end. The flange 20a engages with a step portion 3c formed at the upper end of the support member 3b so that the selector knob 3 does not slip through the hole 1b. The selector knob 3 is fitted to rotate about its axis with respect to the guide member A start/stop button 4 is disposed in the inner peripheral surface of the selector knob 3 in such a manner that the button moves vertically with respect to the front panel 1a. The start/stop button 4 has a disk-like head 4a that gradually decreases in thickness toward the boundaries of the head. The start/stop button 4 has a pair of legs 4b perpendicularly protracting from the bottom center of the head 4a. The legs 4b of the start/stop button 4 pass through the hole 20b which is sufficiently large to accommodate the legs 4b. This configuration enables the start/stop button 4 to slide in the axial direction (the vertical direction with respect to the front panel 1a). Because the rectangular hole 20b prevents the legs 4b from rotating, the start/stop button 4 does not rotate even when the selector knob 3 rotates. Therefore, specific marks, such as function and/or operation arrows which are printed on the head 4a of the start/stop button 4, are positioned always at the same angles. A hook 4c, which projects outward in a radial direction, is formed at the tip of each leg 4b. The hooks 4c protrude through the hole 20b and engages the end surface of the guide member 20. This prevents the start/stop button 4 from disengaging from the guide member 20.

The start/stop button 4 is preferably made of a resilient material, such as a synthetic resin, to prevent deformation of the legs 4b. When the legs 4b are inserted into the hole 20b, the inclined surfaces 4d of the hooks 4c are pressed inward so that the legs 4b are inwardly bent, thus allowing the legs 4b to pass through. After the hooks 4c pass through the hole 20b, the legs 4b return to their original state. Thus, the hooks 4c engage with the end surface of the guide member 20.

A spring 21, which surrounds the legs 4b of the head 4a, is disposed between the head 4a of the start/stop button 4 and the flange 20a of the guide member 20 so that the start/stop button 4 maintains an un-depressed state. A switch 22, which generates a start/stop signal, is affixed on the board 23 at a position substantially underneath the legs 4b. When the start/stop button 4 is depressed, the legs 4b move toward the switch 22 so that the tips of the legs 4b make contact and activate the switch 22. Due to the close proximity of the first 10 and second 11 gears, the switch 22 is affixed on the board 23 near the rotary encoder 12. This configuration may be achieved by disposing the rotation shaft 11a of the second gear 11 at the substantially center of the rotary encoder 12. The rotary encoder 12, the switch 22, and the like may be realized by using commonly available parts rather than specially designed or customized parts. Using such parts may increase the design flexibility of the control device since these parts may be arranged in many configurations without sacrificing the vertical dimension of the control device.

The sing-along or karaoke apparatus which the preferred embodiment of the control device also has following components. A read-only-memory (ROM) cartridge 50 shown in FIG. 2 contains a ROM for storing performance information (i.e., musical instrument digital interface (MIDI)

information), music piece titles, and the like. For example, the ROM cartridge 50 having fifty music pieces has corresponding performance information, titles, etc. The ROM cartridge 50 is detachably attached to the body 1 so that different cartridges may be plugged into the body 1.

A next button 30 is a switch that, when activated, skips the preselected music piece and retrieves the next preselected music piece. An entry button 31 is a switch that, when activated, selects and stores preselected information related to a music piece in the karaoke apparatus. A title button 32 is a switch that, when activated, displays the titles stored in the ROM cartridge 50. The ROM cartridge 50 contains displayable information indicative of music titles and other information. A random button 33 is a switch that, when activated, selects music pieces in the ROM cartridge 50 at random. A game button 34 is a switch that, when activated, renders the karaoke apparatus into a game mode for playing such games as naming the title of a music piece, while listening to the music in high-speed, low-speed, or the like.

In the karaoke apparatus, melody switch 35 is used to either activate or deactivate the display of a music melody for a selected music piece. This function is useful to aid a user of the apparatus who does not remember the melody of the music piece. The melody switch 35 may be activated to display the melody of the music to assist the user. If the user is familiar with the music melody, the melody switch 35 maybe deactivated. A sound switch 36 is used to control the sound quality options, such as reverberation and filter characteristics. In one type of karaoke apparatus, there may be two customized sound quality options for playing the karaoke apparatus either in or outside the car. The karaoke apparatus also has a power switch 37 with three options: "Power OFF," "Power ON," and "Power ON and Backlight of liquid crystal display unit ON."

The reference numerals 40u and 40d designate key control switches for changing the key (i.e., octave) of each music piece. When the key switch 40u is depressed, a higher key is selected in incremental steps. When the key switch 40d is depressed, a lower key is selected in decremental steps. The reference numerals 41u and 41d designate tempo switches for changing the tempo of each music piece. The tempo increases when the tempo switch 41u is depressed. The tempo decreases when the tempo switch 41d is depressed. A microphone volume knob 45 on the karaoke apparatus adjusts the sound level from a microphone. An echo volume knob 46 controls the degree of echo effects added to the microphone signal.

Figure 5:
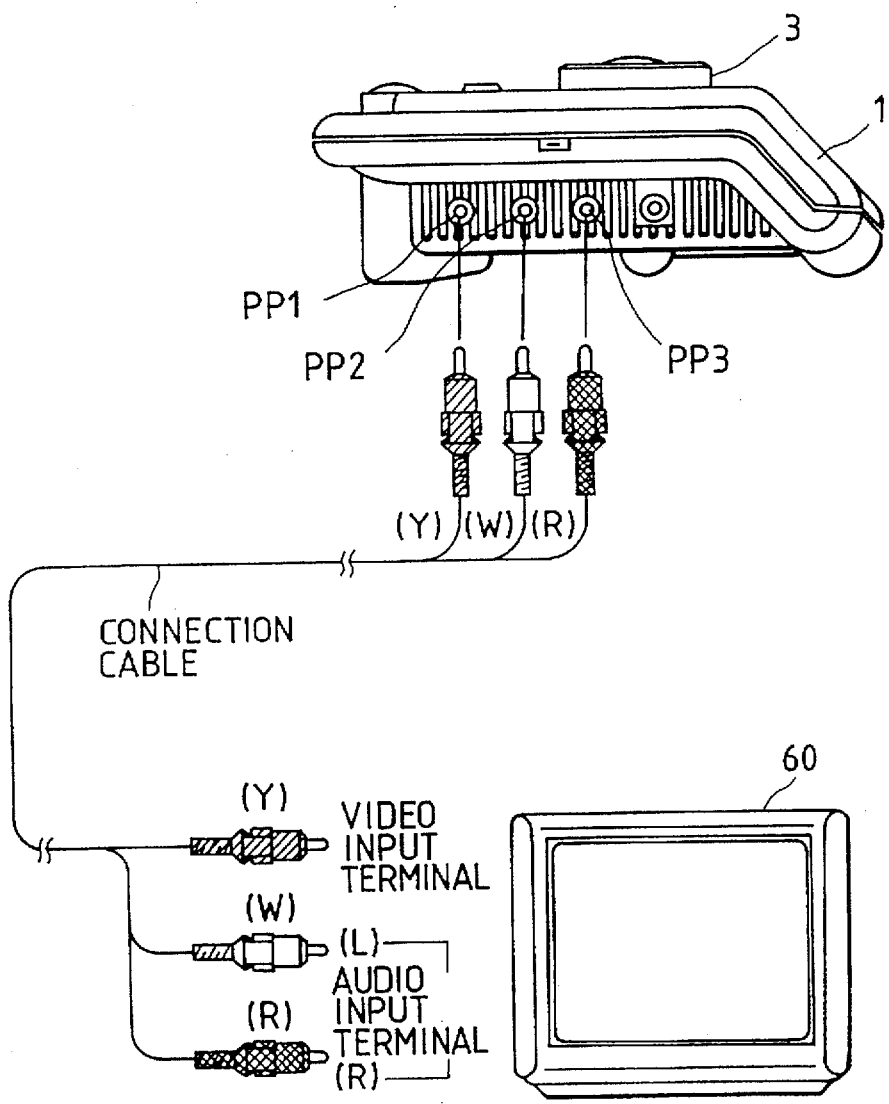
FIG. 5 is a connection diagram showing the interface between an external output device and a sing-along or karaoke apparatus.

In FIG. 5, PP1, PP2, and PP3 designate external output terminals from the karaoke apparatus. The terminal PP1 is a video output terminal. The terminals PP2 and PP3 are audio output terminals for left and right channels. The terminals PP1, PP2, and PP3 may be connected to an external output device with a set of connection cable, such as a television set 60.

Figure 1:
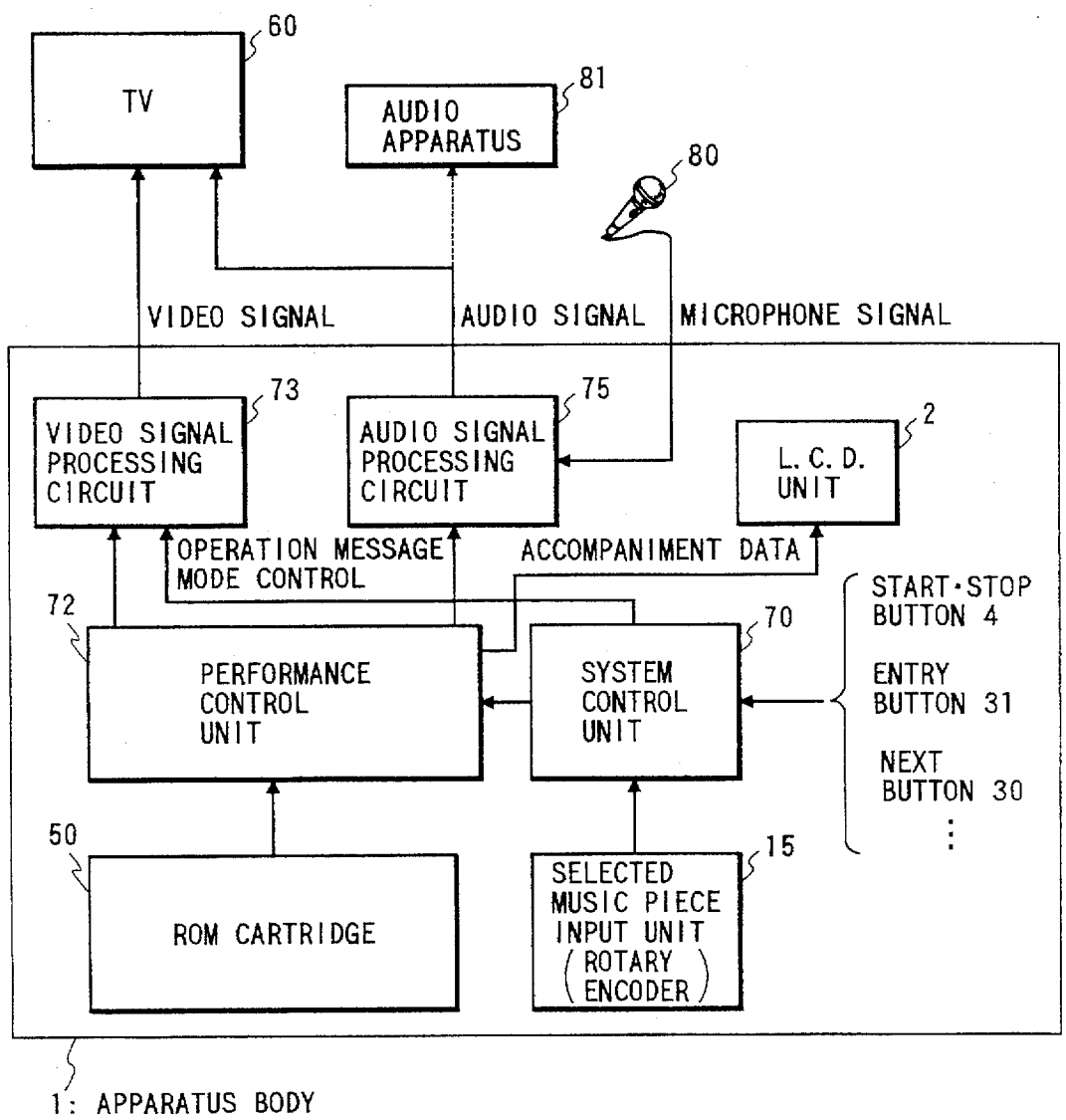
FIG. 1 is a block diagram of a sing-along or karaoke apparatus which uses a control device according to an embodiment of the invention.

FIG. 1 is a block diagram of the karaoke apparatus using the control device according to an embodiment of the invention. In the apparatus, a system control unit 70 is connected to and controls various circuits. For example, the system control unit 70 controls a performance control unit 72 and a video signal processing circuit 73 in accordance with the pulse signal supplied from the music selection input unit 15 and the signals from various control buttons and switches. The performance control unit 72 reads the data from the ROM cartridge 50 and supplies video information indicative of music piece titles and words, such as song lyrics, to the video signal processing circuit 73. The performance control unit 72 also provides performance information of a selected music piece to an audio signal processing circuit 75. The audio signal processing circuit 75 mixes a voice signal from a microphone 80 with the performance information supplied from the performance control unit 72. The audio signal processing circuit 75 amplifies and produces the mixed signal. The signals produced from the video signal processing circuit 73 and the audio signal processing circuit 75 are supplied to an external output device, such as a television set 60. The output signal of the audio signal processing circuit 75 may also be supplied to an external audio apparatus 81, such as a stereo amplifier.

FIG. 6 shows a memory map of the ROM cartridge 50. Each row of the memory map represents four areas (i.e., four addresses) and each area (in other words, address) includes 1-byte. Other ROM cartridges with different collections of music pieces may be used. However, it is preferable to use the ROM cartridges with the similar memory format. Addresses 0 to 83 (84 bytes) are preferably used as a fixed area in the cartridge 50 for storing the same kind of data in the same addresses. For example, a text code indicative of the cartridge determination and the memory size is stored at addresses 0–3. Addresses 80 to 83 contain a pointer P-FSA indicating the location that stores the start address of the performance data (MIDI data) for a first music piece in the ROM cartridge 50. The start address of performance data of the first music piece is stored in a 32-bit area from the address indicated by the pointer P-FSA. The end address of the performance data of the first music piece is also stored in the ROM cartridge 50. In the ROM cartridge 50, the end address may be stored in a 32 bit area from the fourth address indicated by the pointer P-FSA. Similarly, the next four-address set contains the start address of performance information for a second music piece and the further next four-address set contains the end address of performance information for a second music piece. Thus, for example, there are 50 four-address sets in a ROM cartridge 50 containing 25 music pieces.

Addresses 68 to 71 contain a pointer P-KFN indicating the address that stores the first music piece title 1. For example, the title information which consists of a certain maximum number of characters, such as 11 full-size characters or less, is stored in a 24-byte area which starts from the address indicated by the pointer P-KFN. The titles of second and subsequent music pieces are similarly stored at every four-address therefrom. The title information is preferably used for television display and contains codes for specifying alphanumeric and foreign language characters, such as kana/kanji characters.

Addresses 72 to 75 contain a pointer P-KFNK indicating the start address of an area that contains title information for the liquid crystal display 2 of the karaoke apparatus. Alphanumeric and foreign language characters, such as katakana characters for the first music piece title consisting of the maximum 11 characters are stored in a 24-byte area which starts from the address indicated by the pointer P-KFNK. The titles of the second and subsequent music pieces are similarly stored at every four-address therefrom.

Addresses 76 to 79 contain a pointer P-BMF indicating the start address of an area that contains font data of the bit map. This area contains font data for special characters used in the title (characters which are not in the font data of the performance control unit 72). The areas for storing performance data and word information are not shown in FIG. 6.

Figure 7A:
FIGS. 7(a) and (b) are samples display of a music selection menu on an external output device and a built-in display unit of a sing-along or karaoke apparatus.
Figure 7B:
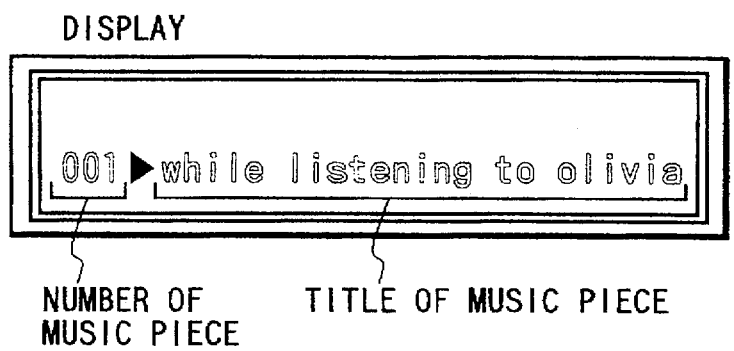

The operation of the preferred embodiment of the control device and the operation of the karaoke apparatus will now be described. When the power switch 37 is first turned ON, the performance control unit 72 reads the title information of the first sixth music pieces from the ROM cartridge 50, including the pointer P·KFN. The title information for these music pieces is converted into corresponding text codes. Then, the font data corresponding to the text codes are transferred to the video signal processing circuit 73. The video signal processing circuit 73 displays the font data on the television set 60, as shown in FIG. 7(a). First six lines of the screen are the titles of the music pieces with their respective numbers. In FIG. 7a, the title "While listening to Olivia" bearing the number "001" is initially selected. The selected title is highlighted (displayed brighter than the other titles). The lower part of the television screen has a window for displaying a title for one music piece. The window separately displays the highlighted title of the upper screen. For example, as shown in FIG. 7(a), the lower window displays the title "While listening to Olivia" bearing the music piece number "001." In addition, the performance control unit 72 reads the title information (for liquid crystal display) of the first music piece, including the pointer P·KFNK. The title information is supplied to the liquid crystal display unit 2. As shown in FIG. 7(b), the liquid crystal display unit 2 displays the number and the title (including foreign characters, such as katakana characters) of the first music piece.

When an operator rotates the selector knob 3, the rotation corresponding to the gear ratio is transferred to the rotary encoder 12. The music selection input unit 15 produces the number of pulse signals corresponding to the rotation amount of the selector knob 3. The pulse signal is then supplied to the system control unit 70. If the selector knob 3 rotates to the right by an amount corresponding to one pulse, the system control unit 70 instructs the performance control unit 72 to select the next music piece. As a result, the performance control unit 72 instructs the video signal processing unit 73 to highlight the second line which shows the number and title of the second music piece (for example, "002 You're My Only Shinin"). The first line containing the number and the title of the first music piece is no longer highlighted. As a result, the line displaying the title of the second music piece is highlighted on the television screen. Concurrently, the lower window of the television screen displays the title of the second music piece. The performance control unit 72 also reads the title information of the second music piece for liquid crystal display from the ROM cartridge 50 and supplies the information to the liquid crystal display unit 2. As a result, the liquid crystal display unit 2 displays the title of the second music piece.

The continued rotation of the selector knob 3 further to the right selects a subsequent music piece. The highlighted portion of the television screen and the content of the liquid crystal display unit 2 are changed accordingly. When the seventh music piece is selected by further rotating the selector knob 3, the performance control unit 72 reads the title information of the second to seventh music pieces from the ROM cartridge 50 (for the television display). Accordingly, the titles and corresponding number of the second through the seventh music pieces are displayed on the television screen, with the seventh music piece title highlighted. In other words, the screen of the television set 60 scrolls up by one line. The scrolling of the screen corresponds to the rotation speed of the selector knob 3. If the selector knob 3 rotates rapidly, the screen scrolls rapidly. Therefore, even a music piece located near the end of the music library may be easily selected by rapidly rotating the selector knob 3. Conversely, if the selector knob 60 rotates to the left, the line which is highlighted on the television screen sequentially shifts up, thus making the screen to scroll down.

When the selector knob 3 rotates and selects an m-th music piece, the performance control unit 72 reads the pointer P·KFN and calculates the address of the title information for television display of the m-th music piece as follows:

(P·KFN)+(m−1)×24,

The 24-byte data in the above calculated address contains the title of the m-th music piece.

Similarly, the address for the m-th music piece containing the 24 byte data title information for liquid crystal display is obtained as follows:

(P·KFNK)+(m−1)×24.

When the music piece subsequent to the last music piece (for example, music piece No. 50) is designated, the performance control unit 72 selects music piece No. 1. When the music piece preceding the first music piece is designated, the performance control unit selects music piece No. 50. In other words, music piece Nos. 1 to 50 constitute a ring structure so that the selection wraps around after the last music piece (for example, music piece No. 50) is selected. Consequently, a desired music piece may be easily and quickly searched by rotating the selector knob 3 to the right or the left.

Figure 8A:
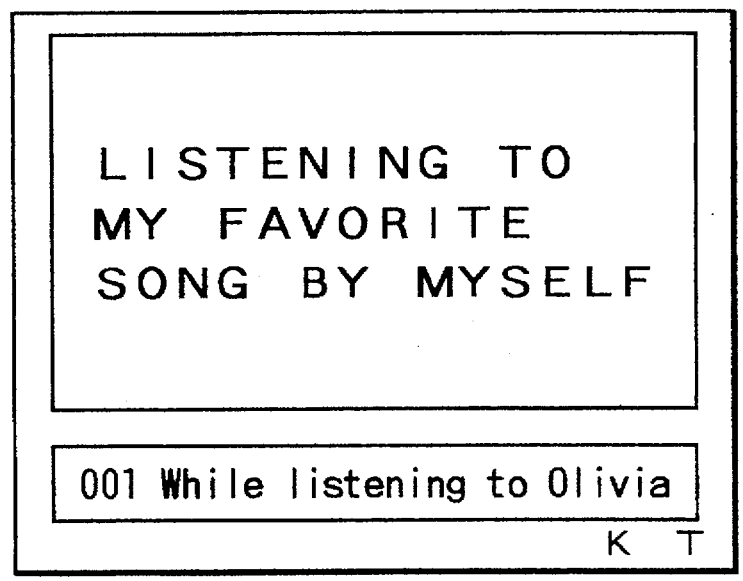
FIGS. 8 (a) and (b) are samples display of an external output device and a built-in display unit of a sing-along or karaoke apparatus during a music program performance.

When the start/stop button 4 is depressed after selecting a desired music piece, the tips of the legs 4b press the switch 22, as shown in FIG. 4. When the force depressing the start/stop button 4 disappears, the button 4 returns to the original state by the resilient force of the spring 21. The switch 22 produces a signal, such as an ON signal which is fed to the system control unit 70. The system control unit 70 instructs the performance control unit 72 to start the music performance after receiving the ON signal from the switch 22. The performance control unit 72 reads the start and end addresses corresponding to the performance data of the selected music piece by referencing the pointer P·FSA in the ROM cartridge 50. The performance control unit 72 reads the performance data in the designated area to create performance information. The performance information is then transferred to the audio signal processing circuit 75. In conjunction with the reading of the performance data, the performance control unit 72 reads word information, such as song lyrics, of the selected music piece and transfers it to the video signal processing unit 73. The video signal processing unit 73 provides the display information, which corresponds to the words of the music piece to the television set 60. The displayed song lyrics change color or are gradually colored as the performance of the music piece proceeds. In other words, the lyrics corresponding to that music portion already played are in different color than the lyrics not yet performed. When the start/stop button 4 is depressed after selecting a music piece, such as the first music piece "While listening to Olivia," the words are displayed on the screen of the television set 60, as shown in FIG. 8(a). The letters "K" and "T" in the lower portion of the screen is used for displaying information corresponding to the key and the tempo of the music being performed.

Figure 8B:

The performance control unit 72 also reads word information written in alphanumeric or foreign characters, such as katakana characters, from the corresponding area of the ROM cartridge 50 and supplies them to the liquid crystal display unit 2. As a result, the liquid crystal display unit 2 may display the words of the music piece in foreign characters. In the liquid crystal display, a cursor, which is shown under a katakana word in FIG. 8(b), moves according to the progress of the music piece being performed. In FIG. 8(b), the cursor is positioned under letter "i" of the word "favorite."

In the karaoke apparatus, a selected music piece may be performed immediately or a plurality of music pieces may be preselected and stored in any sequence. In the preselection mode, a desired music piece may be selected by operating the selector knob 3 and depressing the entry button 31. When the entry button 31 is depressed, the system control unit 70 issues a preselection command to the performance control unit 72. The performance control unit 72 stores the selected music piece in a predetermined memory space. Other preselected music pieces may be stored in the same manner. When the start/stop button 4 is depressed, the preselected music pieces begin performing in the order corresponding to the selection process (i.e., the first music piece selected performs first).

Figure 9A:
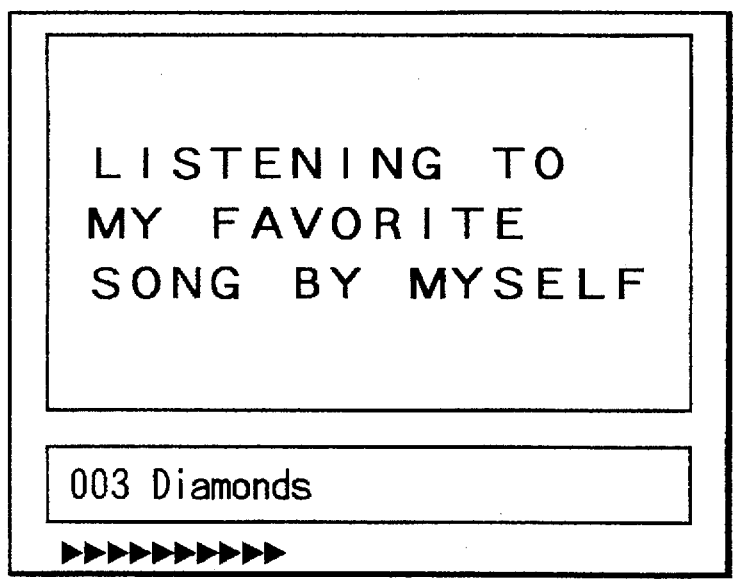
FIGS. 9 (a) and (b) are samples display of an external output device and a built-in display unit of a sing-along or karaoke apparatus showing a music piece selection process during a music program performance.

The preselection process may be conducted while a music piece is being performed. During the performance, the music lyric is shown on the screen of the television set 60, as shown in FIG. 8(a). The title of the music piece corresponding to the music lyric is displayed in the lower window of the screen. When the selector knob 3 rotates while a music is being performed, the title shown in the lower window changes in accordance with the rotation amount of the selector knobs. When the title of a desired music piece is displayed in the window, the entry button 31 may be depressed to select and store the music piece information in the performance control unit 72. For example, FIG. 9(a) shows the state where the third music piece entitled "Diamond" is selected during the performance of another music piece. The triangular symbols displayed below the lower window represents the total number of preselected music pieces. In the illustrated example, ten music pieces are preselected which are represented by ten triangle symbols.

Figure 9B:
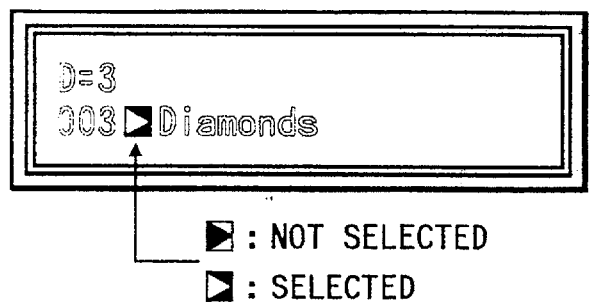

FIG. 9(b) illustrates the content of the liquid crystal display unit 2 when selecting a music piece while another music piece is being performed. Normally, the liquid crystal display unit 2 displays song lyrics during the performance. When the music selection input unit 15 outputs a pulse signal to cause the system control unit 70 to issue a preselection command, the performance control unit 72 switches the display mode from displaying song lyrics to displaying the titles of selected music pieces. After a predetermined period, the liquid crystal display returns to its normal state by replacing the titles of selected music pieces with the song lyrics of the music piece currently being performed.

In the karaoke apparatus, the activation of the title button 32, shown in FIG. 2, allows the system control unit 70 to instruct the performance control unit 72 to display the music titles. The performance control unit 72 reads the title information stored at address Nos. 4 to 27 of the ROM cartridge 50 and transfers it to the video signal processing unit 73. As a result, the title of the ROM cartridge 50 is displayed on the television set 60. This feature provides a convenient way to identify the ROM cartridge 50 loaded in the karaoke apparatus.

An alternative embodiment of the invention will now be described. In the preferred embodiment, the start/stop button 4 does not rotate. However, the start/stop button 4 may be configured to rotate with the selector knob 3. Also, in the preferred embodiment, the selector knob 3 and the start/stop button 4 are separately constructed. Alternatively, these two components may be integrated into one body or may be constructed as one component. In the alternative, the selector knob 3 may be configured to rotate about its axis and slide in the axial direction. This allows the selector knob 3 to function as a start/stop button. In this configuration, the first gear coupled to the selector knob 3 may have a sufficiently large length to engage the second gear 11 even when the selector knob 3 is axially moved. The transfer mechanism which transfers the rotation movement of the selector knob 3 to the rotary encoder 12 may be constructed differently. For example, the gears 10 and 11 may be replaced with pulleys and a timing belt wound around the pulleys. Also, the switch 22 may be a mechanical switch (such as a push button switch), a magnetic switch (such as a proximity switch), or an optical sensor (such as a photointerrupter).

In another embodiment of the invention, the performance preselection and its cancellation function may be implemented by using the start/stop button 4. For example, if the start/stop button 4 is activated while currently highlighted music piece is being performed, the performance of the music piece stops. If the start/stop button 4 is activated while designating a music piece which is different from the one being performed, the designated music piece may be canceled from the preselection library.

In a karaoke apparatus, the titles of designated music pieces are displayed on the screen, and a music piece may be designated by rotating the selector knob 3. However, the title of a music piece may not be sufficient to remember the lyrics and melodies of the music piece. To alleviate this problem, certain portions of the music piece, such as the most recognizable portion, the introduction portion, the refrain portion and the like, may be stored in the ROM cartridge 50 in addition to the title information of the music piece. When such information is stored in the MIDI information format, the memory requirement may be minimized. The memory requirement may be further reduced by storing only the melody portions. When a predetermined switch is activated, the above melody information is read and then played. The replay of the recognizable melody of the music piece while displaying the corresponding title may allow the user to remember the music piece.

In the karaoke apparatus, the performance control unit 72 and the system control unit 70 may be implemented by using a microcomputer or other similar devices. In such a case, the two units may be configured into one integral unit. In addition, instead of using a ROM cartridge 50, the karaoke apparatus may be configured to use a CD-ROM, a mini disk (MD), a battery-backed RAM or the like.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. A control device suitable for use in an apparatus for reproducing pre-recorded performance and title information of a plurality of music pieces, the control device comprising:

a knob which is rotatable about an axis:;

an actuating member slidably moveable in a direction of the axis of the knob;

a rotation encoder which is responsive to a rotation motion of the knob, wherein the rotation encoder produces a pulse signal corresponding to the rotation motion of the knob, and wherein the pulse signal triggers the apparatus to scan the titles of the plurality of music pieces;

a transfer mechanism having a predetermined transfer ratio, wherein the transfer mechanism includes a first gear coupled to the knob and a second gear coupled to the rotation encoder, in which the first gear and the second gear directly engage each other to transfer the rotation motion of the knob to the rotation encoder; and a switch which is mounted substantially underneath the actuating member and is activated by depressing the actuating member of the knob, downwardly along the axis of the knob wherein the switch generates a signal to trigger the apparatus to select a music piece or to start/stop playing a music piece.

2. A control device according to claim 1, wherein the actuating member comprises a pair of legs protruding downward to activate the switch when the actuating member is depressed.

3. A control device according to claim 1, wherein the knob has a spring disposed underneath the actuating member to maintain an un-depressed state when no pressure is applied onto the actuating member.

4. A control device according to claim 3, wherein the switch is located substantially adjacent to the rotation encoder to maintain a compact design of the control device.

5. A control device according to claim 1, wherein the predetermined transfer ratio is a number greater than 1, so that the rotation encoder produces more than one pulse signal for each revolution of the knob.

6. A control device according to claim 1, wherein the predetermined transfer ratio is 2.

7. A control device according to claim 6, wherein the rotation encoder produces one pulse signal for each tooth of the second gear rotated.

8. A control device according to claim 1, wherein the actuating member is disposed within the knob, in which the movement of the actuating member is independent of the rotation of the actuating member.

9. A control device suitable for use in an apparatus for reproducing pre-recorded performance and title information of a plurality of music pieces, the control device comprising:

a knob which is rotatable about an axis;

an actuating member slidably moveable in a direction of the axis of the knob;

a rotation encoder which is responsive to a rotation motion of the knob, wherein the rotation encoder produces a pulse signal corresponding to the rotation motion of the knob;

a transfer mechanism having a predetermined transfer ratio, wherein the transfer mechanism is coupled between the knob and the rotation encoder to transfer the rotational motion of the knob to the rotation encoder; and a switch which is mounted substantially underneath the actuating member and is activated by depressing the actuating member of the knob downwardly along the axis of the knob.

10. A control device according to claim 9, wherein the transfer mechanism includes a first gear coupled to the knob and a second gear coupled to the rotation encoder, in which the first gear and the second gear directly engage each other to transfer the rotation motion of the knob to the rotation encoder.

11. A control device according to claim 9, wherein the transfer mechanism includes a plurality of pulleys and a belt wound around the plurality of pulleys, wherein the a first pulley of the plurality of pulleys is coupled to the knob and a second pulley of the plurality of pulleys is coupled to the rotation encoder.

12. A control device suitable for use in an apparatus for reproducing pre-recorded performance and title information of a plurality of music pieces, the control device comprising:

a knob which is rotatable about an axis and slidably moveable in a direction of the axis of the knob;

a rotation encoder which is responsive to a rotation motion of the knob, wherein the rotation encoder produces a pulse signal corresponding to the rotation motion of the knob;

a transfer mechanism having a predetermined transfer ratio, wherein the transfer mechanism is coupled between the knob and the rotation encoder to transfer the rotation motion of the knob to the rotation encoder; and a switch which is mounted substantially underneath the actuating member and is activated by depressing the knob in the direction of the axis of the knob.

* * * * *